Patented Mar. 30, 1943

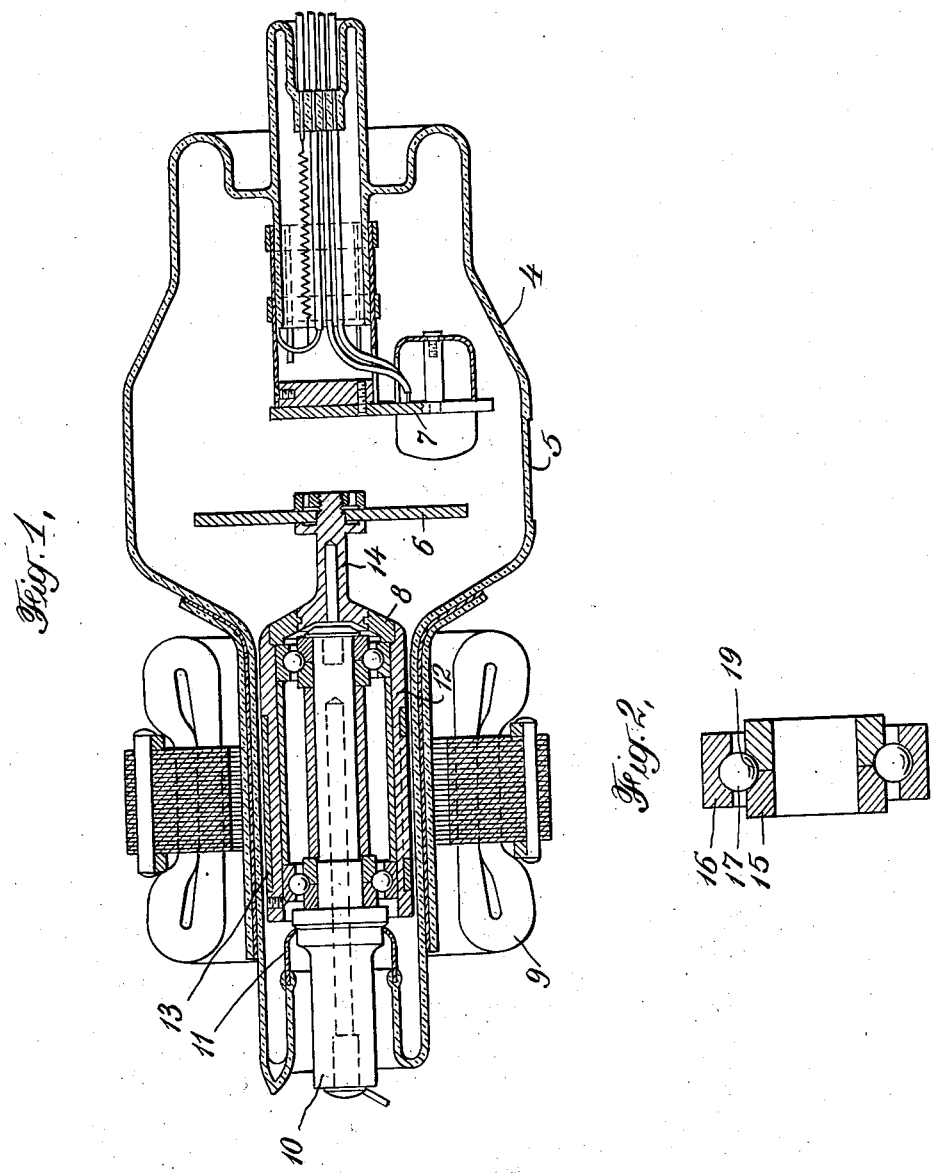

2,315,280

UNITED STATES PATENT OFFICE 2,315,280

VACUUM TUBE APPARATUS

Joseph W. Skehan and George J. Agule, Stamford, Conn., assignors to Machlett Laboratories Incorporated, Springdale, Conn., a corporation of Connecticut Application March 10, 1939, Serial No. 260,884

8 Claims. (Cl. 250—148)

This invention relates to vacuum tube apparatus having one or more parts mounted for rotation within the tube. More particularly, the invention relates to the bearing or bearings whereby such a part is so supported within the evacuated envelope of the tube as to be freely rotatable therein.

In vacuum tube apparatus of this class, it has been proposed heretofore that the part which is rotatable within the tube be mounted therein in ball bearings whose balls and races are made of special materials whereby great hardness is imparted to them, as by making them of an alloy steel containing such ingredients as tungsten, chromium, molybdenum, or combinations of them. The operating characteristics of such a tube are often of such a nature as to preclude the employment of any one of the usual lubricants in the bearing and special lubricants which have been proposed have not been found acceptable. This condition as to lubrication has led to the use of bearings of the rolling type without lubrication of any kind, and, while operation in this way is possible, it is very unsatisfactory because the friction and noise in the bearings are much too great and the friction varies over a wide range under the varying conditions of operation.

In accordance with this invention, markedly superior results are obtained by supporting the rotatable part in bearings of the rolling type wherein the bearing members are made of great hardness and are supplied with a lubricant in the form of a metal which is much softer than that of which the rolling bearing members are made, this metal being preferably one having a low vapor pressure and a low affinity for the metal of which the bearing members are made. The metal which appears to be best suited to this use and which has been found to serve the purpose well is silver.

The invention is of special utility in X-ray tubes of the class known as rotating target tubes. In such a tube an evacuated envelope encloses the rotor of an induction motor arranged to rotate the target which receives the electron stream from the cathode. It is of great importance that the rotor of such a tube be so mounted within the tube that its rotation will be accompanied with a minimum of frictional resistance and that the resistance will be held within a small range of variation through a long period of use notwithstanding wide variation of the operating conditions.

When the rotor of such an X-ray tube is mounted in ball bearings made of hard steel, the employment of any one of the usual lubricants in the bearings is not permissible because its lubricating quality would be impaired considerably in the process of outgassing the tube to free the materials of occluded gases, and also it would give off gases to the space within the envelope of the tube under the temperature conditions of normal operation.

When such hard steel rolling bearings without lubrication of any kind are employed to support the rotor of a rotating target X-ray tube, the friction and noise in the bearings are much too great, the friction varies over a considerable range, the speed of rotation is cut down, and the desired uniformity and certainty of operation are unattainable. This condition as to friction and noise in the bearings appears to result from changes in the condition of the cooperating surfaces of the rolling bearing members effected in the process of degasifying the tube, an operation which is essential to perfecting the tube and which involves a high degree of evacuation of the tube under high temperature, such as a temperature running up to 600° C. in the bearings.

When the bearings for such a rotating target tube are supplied with a soft metal lubricant in accordance with this invention, the operation is far more satisfactory, frictional resistance and noise in the bearings being greatly reduced and the speed of rotation of the rotor being higher and much more nearly uniform over an extended period of use.

The metallic lubricant may be applied directly to one or more of the members of a bearing of the rolling type and various expedients may be employed in that connection. The procedure which we have found best suited to practical conditions is to apply the softer metal to the hard steel balls of a ball bearing by subjecting the balls to a prolonged tumbling operation in contact with a multiplicity of small pieces of silver, such as spheres of silver of very small size compared to the size of the balls. This tumbling operation, conducted over an extended period of time, appears to result in the deposit of a thin film of silver upon the surface of the balls, filling minute cavities on the surfaces of the balls which appear to exist even though the balls are subjected to a high degree of polishing.

The effectiveness of such a metal as silver as a lubricant for a ball bearing whose balls and races are made of hard steel and are used for supporting a rotatable member within a vacuum tube, appears to result from the fact that it is soft compared to the material of the bearing members and has a low affinity for the metal of which the bearing members are made and has a low vapor pressure. When a bearing of the rolling type supplied with such a soft metal lubricant in the manner indicated in the foregoing is employed for supporting the rotor of a rotating target X-ray tube, the soft metal appears to offset to a large extent the effect of the process of degasifying upon the coacting surfaces of the members of the rolling bearing. The result is that frictional resistance in the bearings is not substantially increased as a consequence of the degasifying process; and, furthermore, such a lubricant having a low vapor pressure has no detrimental effect upon the condition of the space within the evacuated tube under the conditions of operation of the tube, particularly at the elevated temperature which prevails within the tube during operation.

The invention may be employed in a wide variety of different forms of vacuum tube apparatus having rotatable members therein. In the accompanying drawing we have illustrated the invention as applied to a rotating target X-ray tube, the particular type of such tube illustrated being that described in detail in Patent No. 2,216,887, issued October 8, 1940, on an application filed by Raymond R. Machlett. That construction is illustrated in part in the accompanying drawing wherein Fig. 1 is a cross-section of the tube, and Fig. 2 is a sectional view on an enlarged scale of the bearing shown in Fig. 1.

In the drawing the tube is shown as consisting of a glass envelope 4 having a window 5 therein. The target is shown at 6 arranged to receive the electronic discharge from the opposed cathode indicated generally at 7.

The target 6 is rotated by an induction motor whose rotor, indicated at 8, is mounted within a contracted portion of the envelope 4, and the field windings 9 of the motor are outside the envelope 4 encircling the rotor 8.

The rotor of the motor is mounted for rotation upon a support 10 which is sealed in a reentrant portion of the tube 4 by a tubular metallic seal 11. The rotor includes a cylinder 12 of ferro-magnetic material mounted for rotation on the portion of the support 10 projecting within the tube and having copper bars 13 set in its periphery. The cylinder 12 is extended as shown at 14 to constitute a support for the target 6 which is in the form of a disc.

The rotor of the motor is mounted for free rotation upon the support 10 by means of two ball bearings each of which consists of inner and outer rings or races 15 and 16 and balls 17 between them. The rings and balls are preferably made of hard steel and their coacting surfaces are highly polished as is common in bearings of this type.

In accordance with this invention a lubricant is applied to each of these bearings in the form of a metal which is softer than that of which the balls and races are made and has a low order of affinity for the metal of which the balls and races are made and a low vapor pressure. Of the metals fulfilling the above requirements, that which has been found to be well adapted for the purpose is silver.

The soft metal lubricant may be applied to either the balls or the races and it is applied in the form of a very thin film, preferably a thin film applied to the surfaces of the balls as is indicated at 19 in Fig. 2.

In the preparation of such a bearing as that indicated in Fig. 2 in accordance with the invention, the application of the metallic lubricant to the balls is preferably effected by subjecting the balls to a prolonged tumbling operation in contact with a multiplicity of small pieces of silver which are preferably in the form of spheres of very small size compared to the balls. As a result of such a tumbling operation, each of the balls has a minute film of silver applied to its surface.

With the rotor supported in ball bearings having a soft metal lubricant applied thereto as herein described, the effect upon the cooperating bearing of the process of out-gassing the tube to extract occluded gases from the parts therein is so far offset by the soft metal lubricant that frictional resistance to the rotation of the rotor is low and is held at a low point throughout an extended period of use of the tube; and the high temperature conditions incident to operation of the tube do not result in the evolution of gases or vapors from the lubricant which would have a detrimental effect upon the evacuated space within the tube.

We claim:

1. A bearing for use within an evacuated envelope which comprises members having working surfaces in contact and rolling one upon the other, the members being made of a hard metal, and a thin layer of silver on the working surface of at least one of the members.

2. A bearing for use within an evacuated envelope which comprises members having working surfaces in contact and rolling one upon the other, the members being made of a hard ferrous alloy, and a thin layer of silver on the working surface of at least one of the members.

3. In an X-ray apparatus which includes a rotatable target, a support therefor, and an evacuated envelope enclosing the target and support, a bearing between the target and support comprising members having working surfaces in contact and rolling one upon the other, the members being made of steel, and a layer of silver on the working surface of at least one of the members.

4. In an evacuated envelope, a bearing which comprises a pair of races and balls rolling between the races, the races and balls being of steel and the balls carrying a thin layer of silver.

5. An X-ray generator comprising an evacuated casing, cathode and cooperating anode means in said casing, bearing means turnably supporting said anode means within said casing, said bearing means including bearing members which roll one on the other and have working surfaces made of a hard metal, and a thin layer of silver on the working surfaces of at least one member.

6. An X-ray generator comprising an evacuated casing, cathode and cooperating anode means in said casing, bearing means turnably supporting said anode means within said casing, said bearing means including bearing members which roll one on the other and have working surfaces made of a hard ferrous alloy, and a thin layer of silver on the working surfaces of at least one member.

7. An X-ray generator comprising an evacuated casing, cathode and cooperating anode means in said casing, bearing means turnably supporting said anode means within said casing, said bearing means including races and balls rolling between the races, the working surfaces of the races and balls being made of a hard metal, and a thin layer of silver on the surfaces of the balls.

8. An X-ray generator comprising an evacuated casing, cathode and cooperating anode means in said casing, bearing means turnably supporting said anode means within said casing, said bearing means including races and balls rolling between the races, the working surfaces of the races and balls being made of a hard ferrous alloy, and a thin layer of silver on the surfaces of the balls.

JOSEPH W. SKEHAN.
GEORGE J. AGULE.